Sept. 7, 1943.  C. L. DICKSON  2,328,966
DECIMAL FINDER
Filed Dec. 8, 1939
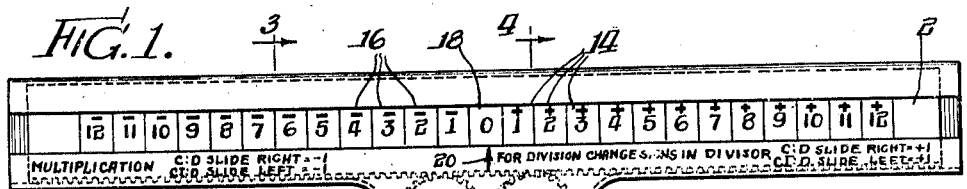
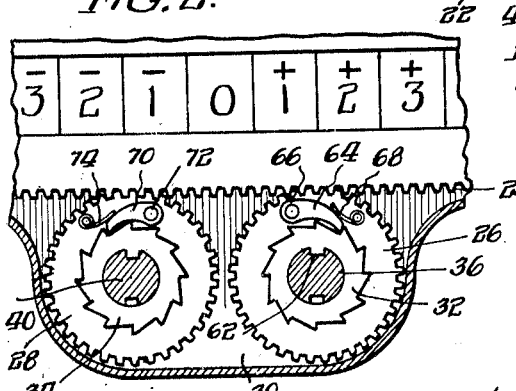
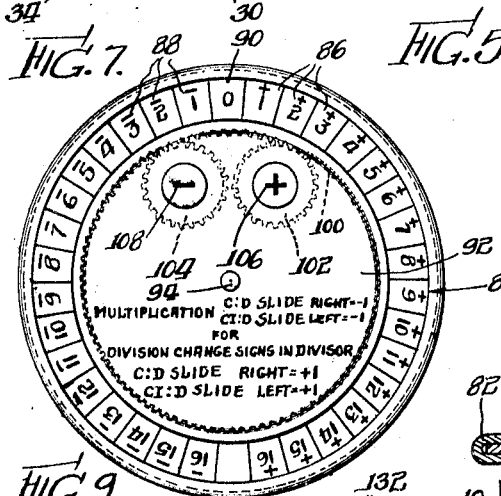
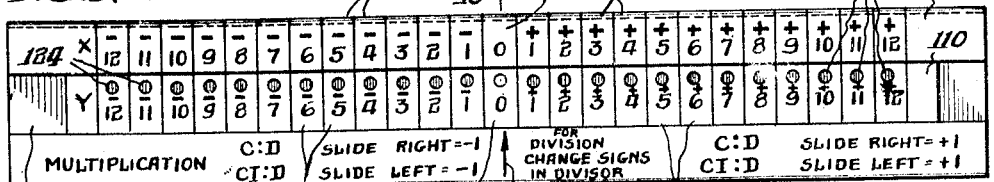
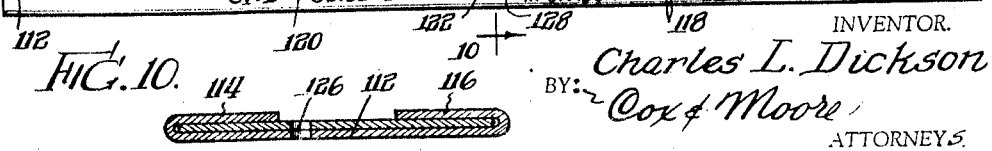
INVENTOR.
Charles L. Dickson
BY Cox & Moore
ATTORNEYS.

Patented Sept. 7, 1943

2,328,966

UNITED STATES PATENT OFFICE 2,328,966

DECIMAL FINDER

Charles L. Dickson, Harvard, Ill.

Application December 8, 1939, Serial No. 308,125

6 Claims. (Cl. 235—69)

This invention relates to a decimal indicator. It is an object of the invention to devise an instrument, for use in conjunction with or as an appurtenance to a slide-rule or other similar calculator, which provides a physical means of locating the decimal point in a numerically complex problem.

In order to determine the location of a decimal point in a problem susceptible of solution by a slide-rule or similar calculator, a large number of rules must be followed or committed to memory, and can be accomplished, when dealing with a series of numbers, only by writing down certain characteristics for each number in the problem and then mentally combining these characteristics in accordance with these rules.

It is therefore beyond the ability of the average person to utilize a slide-rule or similar calculator, although use of the slide-rule would be productive of considerable saving in time in most business establishments as a means of making a great many computations which cannot be made by the usual comptometer or which may be accomplished much more rapidly by means of a slide-rule.

It is accordingly an object of applicant's invention to provide a simple physical mechanism which, by manipulation according to a simple set of rules readily understood by all, indicates the proper location of the decimal point in any problem, however complex.

Other and further objects of the invention will be apparent from the following description when taken in connection with the accompanying drawing, wherein Figure 1 is a plan view of an instrument having a single rectilinear scale and embodying the invention;

Figure 2 is a fragmentary enlarged plan view of the instrument shown in Figure 1, with certain parts broken away for purposes of illustration;

Figure 3 is an enlarged cross-section taken on the line 3—3 of Figure 1;

Figure 4 is an enlarged cross-section taken along the line 4—4 of Figure 1;

Figure 5 is a perspective view of an operating key forming part of the instrument shown in Figure 1;

Figure 6 is an enlarged fragmentary view in perspective of the operating key and its guide;

Figure 7 is a plan view of a modified form utilizing a single circular scale;

Figure 8 is an enlarged fragmentary view in section, taken along the line 8—8 of Figure 7;

Figure 9 is a plan view of a modified form utilizing double scales; and

Figure 10 is an enlarged view in section, taken along the line 10—10 of Figure 9.

A slide-rule of the type used by engineers is a convenient time-saving instrument for rapidly effecting a wide variety of computations, but persons of average ability, not having the advanced mathematical training of an engineer, find it very difficult, if not impossible, to determine the proper location of the decimal point in the answer to any but the simplest problem.

An instrument constructed in accordance with applicant's invention provides readily manipulatable means which will automatically indicate the location of the decimal point in any problem, even of the most complex character and, by manipulation in accordance with a simple set of rules, may be easily understood and applied by persons of average ability having no advanced mathematical education.

As shown in Figures 1 to 6 of the drawing for purposes of illustration, a simple form of instrument embodying the invention may comprise a slide 2 mounted for rectilinear movement on a base portion or plate 4 which may be provided with outwardly and inwardly directed opposed flanges or pieces 6, 8, 10 and 12 embracing the opposite longitudinal edges of the slide 2.

The slide 2 is provided with a scale comprising a plurality of subdivisions 14 and 16 disposed on opposite sides of the central subdivision 18, the subdivision 18 being inscribed or marked with a reference symbol, preferably a cipher (0), and the subdivisions 14 and 16 being inscribed or marked with consecutive series of whole numbers increasing in value in opposite directions and away from the central zero (0) carrying subdivision 18. The numbers inscribed in the subdivisions 14 are preferably marked positive (+), and those inscribed in the subdivisions 16 marked negative (—).

As shown in Figure 1, the subdivisions 14 are marked with consecutive whole numbers from +1 to +12, and subdivisions 16 are marked with consecutive whole numbers from −1 to −12. This is illustrative only, for the instrument may be made in different lengths or sizes containing more or less subdivisions 14 and 16, marked with a greater or smaller range of numbers.

The overlying flange or piece 10 is inscribed or marked centrally with an arrow 20 or other character suitably indicating a reference point which is aligned centrally of the zero (0) carrying subdivision 18 of the slide 2 when an operation is begun, and is aligned centrally of a subdivision 14 or 16 when the operation is completed, to indicate, by reference to the number inscribed on the aligned subdivision 14 or 16, the proper location of the decimal point in the problem or operation undertaken.

Suitable operating means 22 is provided for selectively axially shifting the slide 2 step by step to the right or to the left, each step of movement being equal to the width of a subdivision of the slide 2. This step by step operating means may comprise a rack 24 secured to or formed integrally with the slide 2 and extending longitudinally of the edge of the slide which is embraced by the flanges or pieces 6 and 10.

Rack 24 meshes with a pair of gears 26 and 28 mounted in a housing 30 secured in any convenient manner to the vertical flange or piece 6. The gears 26 and 28 may be surmounted by ratchets 32 and 34, the teeth of the ratchets extending relatively in opposite directions. The gear 26 and ratchet 32 are mounted upon a reduced shank portion 36 of a depressible push-button or pin 38, and the gear 28 and ratchet 34 are mounted upon the reduced shank portion 40 of an identical depressible push-button or pin 42.

The pins 38 and 42 are mounted for vertical sliding movement in appropriate openings in the top and bottom walls 44 and 46 of the housing 30, each pin having a recess or groove 48 extending axially of its reduced shank portion and receiving guiding lugs 50 carried by the top and bottom walls 44 and 46 of the housing and projecting inwardly of the openings 52 in which the pins are received.

Each pin is normally held in its upper position and is returned to this position by suitable resilient means, such as a spring 54, encircling the reduced shank portion of the pin and interposed between the top wall 44 of the housing and the enlarged head 56 of the pin. A washer 58 or the like, fastened to the lower edge of each pin, engages the bottom wall 46 of the housing 30 to limit upward movement of its associated pin.

Each pin 38 or 40 is also provided with a spiral or cam groove 60 extending axially of the reduced shank portion of the pin and receiving a lug or other suitable follower 62 formed on and secured to its associated ratchet 32 or 34.

Movement of the ratchet 32 in a counterclockwise direction is transmitted to the gear 26 by means of a pawl 64 secured by a pivot pin 66 to the upper face of the gear 26 and urged into engagement with the teeth of the ratchet 32 by the spring 68 also secured to this face of the gear. Rotation of the ratchet 34 in a clockwise direction is transmitted to the gear 28 by the pawl 70, similar to the pawl 64, and similarly secured as by pivot pin 72 to the upper face of the gear 28. A spring 74, also secured to the upper face of the gear 28, urges the pawl into engagement with the teeth of the ratchet 34.

The spiral grooves 60 and the pins 38 and 42 are so formed that upon depression of the pin 38 the ratchet 32 is rotated in a counterclockwise direction, while upon depression the pin 42 causes the ratchet 34 to rotate in a clockwise direction.

When the gear 26 rotates in a counterclockwise direction with its ratchet 32, the slide 2 is moved to the left or in the "plus (+) direction" of increasing numbers, and when the gear 28 rotates in a clockwise direction with its ratchet 34, the slide is moved to the right or in the "negative (—) direction" of increasing numbers.

After a push-button has been depressed and then released, its associated spring 54 causes it to move upwardly and causes the associated ratchet to rotate in a non-driving direction or relative to the ratchet pawl and its associated gear. The push-button 38, since it compels movement of the slide in the plus (+) direction, is marked or inscribed on its upper face with a plus (+) symbol 76, and the push-button 42, since it effects movement of the slide in the negative (—) direction, is marked or inscribed with the negative (—) symbol 78.

The instrument may be made of any suitable material which may be as inexpensive as desired, since it is not essential to the proper operation of the instrument that the reference symbol 20 be precisely aligned at all times with the center of a subdivision above the symbol. Materials which have a substantial coefficient of expansion and contraction may therefore be employed, and materials especially fabricated to have a very small coefficient of expansion and contraction are not necessary.

The instrument may, for example, be made of sheet-metal pieces produced by stamping operations. The expansion and contraction of these sheet-metal pieces are not, however, sufficient to affect the accuracy of the answer obtained.

In the form shown in Figures 7 and 8, the instrument comprises a disk or base portion 80 having a reversely bent, peripheral edge portion or flange 82 overlying the circumferential edge of a ring or annular member 84 supported upon the surface of the disk 80 for rotation relative thereto. The ring or annular member 84 is provided on its upper face with subdivisions 86 and 88 on opposite sides of the zero (0) carrying subdivision 90. The subdivisions 86 are marked or inscribed with a series of positive (+) whole numbers consecutively disposed in values increasing in a clockwise direction, while the subdivisions 88 are marked or inscribed with a series of negative (—) whole numbers consecutively disposed in values increasing in the counterclockwise direction.

A disk or cover plate 92 is secured in overlying spaced relation to the disk 80, as by a central fastening means 94, such as a rivet, bolt or the like, and suitable spacing members (not shown). The disk 92 is formed at its circumferential edge with an offset flange or depressed portion 96 overlying the inner edge of the annular member 84.

Operating means 98 for the scale carrying member 84 may be substantially identical to the operating means 22 of the instrument shown in Figures 1 to 6, the annular member 84 being provided on its inner edge with gear teeth 100 corresponding to the rack 24.

The operating push-buttons 102 and 104 of the operating means 98 correspond to the operating push-buttons 38 and 42 of the operating means 22 and are similarly marked with the positive (+) symbol 106 and the negative (—) symbol 108. Upon depression of the push-button 102, the scale carrying member is rotated one step in the counterclockwise or positive (+) direction, and upon depression of the push-button 104 this member is rotated one step in the clockwise or negative (—) direction.

In the form shown in Figures 9 and 10, a slide 110, similar to the slide 2 of the instrument shown in Figures 1 to 6, is slidably supported upon a base 112 having reversely bent edge portions or flanges 114 and 116 overlying the opposed longitudinal edges of the slide 110. The slide 110 is provided with subdivisions 118, 120 and 122, corresponding to the subdivisions 14, 16 and 18 of the slide 2, and these subdivisions are similarly marked. Slide 110 is, however, additionally provided with a plurality of perforations or apertures 124, of which there is one for each of the subdivisions 118, 120 and 122. The base member 112 is also provided with a perforation or aperture 126 in alignment with the line of perforations 124 in the slide 110 and transversely thereto aligned with the reference symbol 128 marked or inscribed on the flange 116.

The flange 114 is also provided with a plurality of subdivisions 130 and 132, equal in width to the width of the subdivisions 118, 120 and 122, and similarly marked. The zero (0) carrying subdivision 134 is centrally aligned transversely of the instrument with the perforation 126 in the base member 112 and the reference symbol 128. When the slide 110 is in the zero (0) position shown in Figure 9, the scale marked on the flange 114 is properly aligned with the scale on the slide 110.

By placing a suitable tool or pencil in the perforation 124 of a subdivision 118 aligned with a subdivision 130 marked with the desired positive (+) number, the slide 110 may be moved to the left toward the reference symbol 128, and when the end of the tool drops into the perforation 126, the slide will have been moved the desired number of units in the positive (+) direction. Similarly, by placing a tool or pencil in the perforation 124 of a subdivision 120 aligned with a subdivision 132 carrying the desired negative (—) number, the slide may be moved to the right toward the reference symbol 128, and when the end of the tool drops into the perforation 126, the slide will have been moved the desired number of units in the negative (—) direction.

Upon completion of a given operation or computation, the number indicating the proper location of the decimal point will be found on the scale marked on the slide 110, which scale, for convenience, may be referred to as the "Y" scale. The scale marked upon the flange 114 may, for convenience, be termed the "X" scale.

In utilizing an instrument according to this invention, the following general rules must be observed:

*Rule 1.*—Transpose the numbers in the problem into simple characters, as follows:

(a) If the number contains any whole number, count the numerals to the left of the decimal point, and call this total a plus (+) quantity or character.

(b) If the number is wholly decimal, count the number of ciphers (0) between the decimal point and the first numeral, and call the total a minus (—) quantity or character.

The following examples will indicate the application of this rule:

```
50,522.   =+5
 2,658.   =+4
   420.1  =+3
    95.   =+2
     4.   =+1
     .105 = 0
     .02  =-1
     .00406 =-2
     .0002  =-3
     .00005 =-4
     .000007=-5
```

By taking the first of these examples, it will be seen that the number contains five numerals to the left of the decimal point and hence is given the character of +5, according to the above rule.

Taking the third number of the above examples, it will be seen that it comprises four numerals, of which, however, only three are located to the left of the decimal point, and hence, according to the above rule, this is given a +3 character. The same character would be given to the number even though there were any number of numerals to the right of the decimal point, for, as stated in the above rule, if there is any whole number to the left of the decimal point, this whole number determines the character, and the numerals to the right of the decimal point are ignored.

Taking the sixth of the above examples, it will be seen that there are no ciphers (0) between the decimal point and the first numeral other than zero (0), and hence this is given the character "0."

The seventh example shows a number in which there is one cipher (0) between the decimal point and the first numeral other than zero (0) to the right, and hence, according to the rule, this is given a character of −1.

It will be seen from these examples that in the case of wholly decimal numbers, the numerals to the right of the first numeral other than zero (0) are ignored in determining the character.

*Rule 2.*—When beginning a problem or computation, set the zero (0) of the slide at the position marked by the reference symbol.

This rule needs no illustration.

In effecting a problem in multiplication by means of a slide-rule, the following rules must be observed:

*Rule 3.*—When using slide-rule scales C and D for multiplication, if the slide extends to the right, make a movement equal to −1.

Move the decimal slide according to the characters of the numbers being multiplied.

*Rule 4.*—When using slide-rule scales CI and D for multiplication, if the slide extends to the left, make a movement equal to −1.

Move the decimal slide according to the characters of the numbers being multiplied.

In effecting a problem in division by means of a slide-rule, the following rules must be observed:

*Rule 5.*—Change the signs of all characters of the numbers in the divisor. A plus (+) character becomes minus (—), and a minus (—) character becomes plus (+).

*Rule 6.*—When using slide-rule scales C and D for division, if the slide extends to the right, make a movement of the decimal slide equal to +1.

Move the decimal slide according to the characters of the numbers in the dividend and the divisor.

*Rule 7.*—When using slide-rule scales CI and D for division, if the slide extents to the left, make a movement of the decimal slide equal to +1.

Move the decimal slide according to the characters of the numbers in the dividend and the divisor.

A few simple examples, as follows, serve to illustrate the application of these rules:

*Example 1*

20×30

According to Rule 1: 20=+2; 30=+2.

According to Rules 3 and 4, the decimal slide, i. e., the slide 2, 84 or 110, is moved first a distance of −1, for, in using the slide-rule scales C and D, the slide extends to the right. The decimal slide is then moved a distance of +2, which is the character of the number 20, and then a further distance of +2, according to the character of the number 30.

These movements bring the number +3 to the arrow or reference symbol, indicating, according to Rule 1, that the answer has three numerals to the left of the decimal point. The slide-rule indicates that the result of multiplication is 6.

Therefore, 20×30=6 with a characteristic of +3 which is 600.

*Example 2*

500÷40

According to Rules 1 and 5, 500=+3; 40=+2; but as 40 is a divisor, it becomes (Rule 5) equal to −2.

The zero (0) of the decimal slide is placed at the reference point (Rule 2).

The decimal slide is then moved a distance of +3, according to the character of the number 500, and then a distance of −2, according to the character of the divisor 40.

In using the slide-rule scales C and D to effect this division, the slide extends to the right. According to Rule 6, the decimal slide is therefore moved a distance of +1, thus bringing the character +2 of the decimal slide to the reference point.

Therefore, 500÷40=125 with a characteristic of +2 which is 12.5.

*Example 3*

$$\frac{128 \times .375 \times 9.2 \times 11}{360 \times 16}$$

According to Rules 1 and 5, 128=+3; .375=0; 9.2=+1; 11=+2; 360=−3; 16=−2.

Applying Rules 2, 3 and 6, $$\frac{128 \times .375 \times 9.2 \times 11}{360 \times 16} = 843$$

with a characteristic of 0 which is .843.

To find the square of a number by means of the slide-rule scales A and D, the following rules must be observed:

*Rule 8.*—Move the decimal slide twice the character of the number.

*Rule 9.*—If the answer is found on the left side of the slide-rule scale A, move the decimal slide a distance equal to −1.

*Example 1*

Square the number 50

According to Rule 1, 50=+2.

Move the decimal slide a distance equal to +2; then move it again the same distance, namely, +2.

The answer will be found on the right side of the slide-rule scale A, and hence no further movement is given to the decimal slide.

Therefore, 50 squared=25 with a characteristic of +4 which is 2500.

*Example 2*

Square the number .05

According to Rule 1, .05=−1.

The decimal slide is twice moved the distance −1, according to Rule 8.

The answer is found on the right side of the slide-rule scale A.

Therefore, .05 squared=25 with a characteristic of −2 which is .0025.

*Example 3*

Square the number 20

According to Rule 1, 20=+2.

The decimal slide is twice moved a distance of +2 (Rule 8).

The answer will be found on the left side of the slide-rule scale A. Hence (Rule 9), the decimal slide is moved a distance equal to −1.

Therefore, 20 squared=4 with a characteristic of +3 which is 400.

*Example 4*

Square the number .3

According to Rule 1, .3=0.

According to Rule 8, the decimal slide is not moved.

The answer will be found on the left side of the slide-rule scale A. Hence, according to Rule 9, the decimal slide is moved a distance of −1.

Therefore, .3 squared=9 with a characteristic of −1 which is .09.

To find the square root of a number by means of slide-rule scales A and D, the following rules must be observed:

*Rule 10.*—If the character of the number is even, such as +4, +2, 0, −2, −4, etc., use the right side of slide-rule scale A, and move the decimal slide a distance equal to the character of the number.

*Rule 11.*—If the character of the number is odd, such as +3, +1, −1, −3, etc., use the left side of slide-rule scale A. Move the decimal slide a distance equal to the character of the number, and then move the decimal slide a further distance equal to +1.

*Rule 12.*—The character of the root is one-half (½) of the character shown on the decimal slide at the reference symbol.

*Example 1*

Take the square root of 3,000

According to Rule 1, 3,000=+4.

The character being even, the right side of the slide-rule scale A is used (Rule 10). The decimal slide character at the reference symbol is +4.

Therefore, according to Rule 12, the square root of 3,000=548 with a characteristic of +2 which is 54.8.

*Example 2*

Take the square root of the number 300

According to Rule 1, 300=+3.

The character being odd, the decimal slide is moved a distance equal to +3, and then an additional distance equal to +1 (Rule 11).

The decimal slide character at the reference symbol is +4. According to Rule 11, the left side of the slide-rule scale A is used.

Therefore, according to Rule 12, the square root of 300=173 with a characteristic of +2 which is 17.3.

*Example 3*

Take the square root of the number .3

According to Rule 1, .3=0.

The decimal slide is not moved but, according to Rule 10, the character being even, the right side of the slide-rule scale A is used, and the character of the answer remains 0.

Therefore, the square root of .3=548 with a characteristic of 0 which is .548.

*Example 4*

Take the square root of the number .03

According to Rule 1, .03=−1.

This character being odd, the left side of the slide-rule scale A is used (Rule 11) and the decimal slide moved a distance equal to $-1$ and then a distance equal to $+1$.

Therefore, the square root of $.03 = 173$ with a characteristic of 0 which is $.173$.

In order to find the cube of a number, the following rules must be observed:

*Rule 13.*—Move the decimal slide three times the character of the number.

*Rule 14.*—If the answer is found on the left side ($K_2$) of slide-rule scale K, move the decimal slide a distance equal to $-2$.

*Rule 15.*—If the answer is found on the center scale ($K_1$) of slide-rule scale K, move the decimal slide a distance equal to $-1$.

*Example 1*

Cube the number 20

According to Rule 1, $20 = +2$.

The decimal slide is moved a distance equal to $+6$ (Rule 13).

The answer is found on scale $K_2$ of the slide-rule.

According to Rule 14, the decimal slide is now moved a distance of $-2$.

Therefore, the cube of the number $20 = 8$ with a characteristic of $+4$ which is 8000.

*Example 2*

Cube the number .02

According to Rule 1, the character of this number is $-1$.

The decimal slide is moved a distance equal to $-3$ (Rule 13), and the answer, being found on slide-rule scale $K_2$, the decimal slide is moved a further distance equal to $-2$.

Therefore, the cube of number $.02 = 8$ with a characteristic of $-5$ which is .000008.

*Example 3*

Cube the number .3

According to Rule 1, $.3 = 0$.

The answer is found on slide-rule scale $K_1$ and the decimal slide (Rule 15) moved a distance equal to $-1$.

Therefore, the cube of $.3 = 27$ with a characteristic of $-1$ which is .027.

*Example 4*

Cube the number 50

According to Rule 1, $50 = +2$.

The decimal slide is moved a distance equal to $+6$ (Rule 13).

The answer is found on the right scale ($K_0$) of slide-rule scale K. No further movement is imparted to the decimal slide.

Therefore, the cube of $50 = 125$ with a characteristic of $+6$ which is 125,000.

In order to find the cube root of a number, the following rules must be observed:

*Rule 16.*—If the character of the number is divisible by 3, use right scale ($K_0$) of slide-rule scale K.

Zero (0) is considered divisible by 3.

Move the decimal slide a distance equal to the character of the number.

*Rule 17.*—If the number consists of whole numbers having ($+$) characters which cannot be divided by 3, such as $+1$, $+2$, $+4$, $+5$, $+7$, etc., move the decimal slide to the next highest number divisible by 3.

*Rule 18.*—If the number is wholly decimal, having minus ($-$) characters which cannot be divided by 3, such as $-1$, $-2$, $-4$, $-5$, $-7$, etc., move the decimal slide to the next lowest number divisible by 3.

*Rule 19.*—If the amount of raise or reduction is one unit, use scale $K_1$ of slide-rule scale K.

*Rule 20.*—If the amount of raise or reduction is two units, use scale $K_2$ of slide-rule scale K.

*Rule 21.*—The character of the cube is one-third ($1/3$) of the character shown at the reference symbol of the decimal finder.

*Example 1*

Take the cube root of the number 900

According to Rule 1, $900 = +3$.

This character is divisible by 3. Hence, according to Rule 16, use scale $K_0$ of slide-rule scale K. Since scale $K_0$ is used, no further movement is imparted to the decimal slide.

Therefore, the cube root of $900 = 966$ with a characteristic of $+1$ which is 9.66.

*Example 2*

Take the cube root of the number 90

According to Rule 1, $90 = +2$.

The decimal slide is moved a distance equal to $+2$. This is not divisible by 3. Hence (Rule 17) the decimal slide is moved to the next highest number divisible by 3 which is $+3$. The amount of raise is one unit and (Rule 19) scale $K_1$ of slide-rule scale K is used.

Therefore, the cube root of $90 = 448$ with a characteristic of $+1$ which is 4.48.

*Example 3*

Take the cube root of the number .9

According to Rule 1, $.9 = 0$.

Zero (0) is considered divisible by 3 (Rule 16).

Scale $K_0$ of slide-rule scale K is used (Rule 16).

Therefore, the cube root of $.9 = 966$ with a characteristic of 0 which is .966.

*Example 4*

Take the cube root of .09

According to Rule 1, $.09 = -1$.

This is not divisible by 3. The decimal slide is moved to the next lowest number divisible by 3, namely, to zero (0) (Rule 18).

Scale $K_1$ of slide-rule scale K is used (Rule 19).

Therefore, the cube root of $.09 = 448$ with a characteristic of 0 which is .448.

*Example 5*

Take the cube root of .009

$.009 = -2$, according to Rule 1.

This is not divisible by 3. Hence (Rule 18), the decimal slide is moved to the next lowest number divisible by 3, namely, zero (0).

Scale $K_2$ of slide-rule scale K is used (Rule 20).

Therefore, the cube root of $.009 = 208$ with a characteristic of 0 which is .208.

It will be evident from the foregoing description that applicant has devised an instrument, for use in conjunction with or as an appurtenance to a slide-rule or other similar calculator, which provides a physical means of locating the decimal point in a numerically complex problem.

Applicant has provided a simple physical mechanism which, by manipulation according to a simple set of rules readily understood by all, indicates the proper location of the decimal point in any problem, however complex.

Changes may be made in the form, arrangement and construction of the invention without departing from its spirit or scope or sacrificing any of its attendant advantages, and the right is hereby reserved to make all such changes as fairly fall within the scope of the following claims.

The invention is hereby claimed as follows:

1. A decimal finder comprising members; one of the members carrying a reference symbol; the other of said members carrying a reference symbol, a series of positive numerical characters representing the number of numerals to the left of the decimal point in a given number, said numerical characters increasing in value in a direction away from the second reference symbol, and a series of negative numerical characters representing the number of ciphers between the decimal point and the first numeral other than a cipher in any given wholly decimal number, and indexing means for shifting one of said two members relative to the other in either direction selectively in accordance with the numerical characters of the numbers involved in any given computation, whereby the numerical character or reference symbol on said other of the relatively shiftable members which is in registry with the reference symbol on the said one member indicates the proper location of the decimal point in the answer to the given computation, said finder also comprising indicia, in addition to said symbols and numerals, for indicating the direction of the movement produced by said indexing means.

2. As an article of manufacture, a decimal finder comprising a stationary member having a generally central reference symbol, a member shiftably supported in relation to said stationary member carrying a second generally central reference symbol and numerals increasing in value in opposite directions from this second generally central reference symbol, the distances between the centers of adjacent indicia, including the symbol and numerals on said shiftable member, being equal, and means for shifting said shiftable member relative to said stationary member in either direction selectively comprising a pair of push buttons, one of which moves the shiftable member in one direction and the other of which moves it in the opposite direction, said push buttons being arranged so that each time either of them is completely depressed the shiftable member is shifted relative to the stationary member a distance equal to the distance between the centers of adjacent indicia on said shiftable member.

3. As an article of manufacture, a decimal finder comprising members, at least one of which carries a reference symbol and the other of which carries a second reference symbol, positive numerals increasing in value in a direction away from the second reference symbol and negative numerals increasing in value in the opposite direction away from the second reference symbol, said finder also comprising means for shifting one of said two members relative to the other in either direction selectively through distances equal to the distances from center to center of the indicia on said member carrying a reference symbol and numerals increasing in value in opposite directions therefrom, and indicia, in addition to said symbols and numerals, for indicating the direction of movement produced by said means for shifting.

4. As an article of manufacture, a decimal finder comprising a stationary member and a member shiftably supported in relation to said stationary member, one of said members carrying a reference symbol and the other of said members carrying numeral characters including a cipher and equally spaced positive and negative series of numerals on opposite sides of the cipher and increasing in value in opposite directions, said positive series of numerical characters indicating the number of numerals to the left of the decimal point in any given number, said negative series of numerical characters indicating the number of ciphers between the decimal point and the first numeral other than a cipher in any given wholly decimal number, and means for shifting said shiftable member relative to said stationary member in either direction selectively in accordance with the character of each number and the nature of the given computation whereby the resulting position of said pair of members indicates the location of the decimal point in the answer to the given computation, the said means for shifting said shiftable member relative to said stationary member including means for determining the distance through which the shiftable member is shifted whereby said shiftable member may be shifted relative to said stationary member through distances equal to the distances from center to center of the indicia on said other member, and said finder also comprising indicia in addition to said symbol, said cipher and said numerical characters for indicating the direction of the movement produced by said means for shifting.

5. As an article of manufacture, a decimal finder comprising members, one of which is shiftable relative to the other in either direction selectively and each of which carries a reference symbol and numerals increasing in value in opposite directions from the reference symbol.

6. As an article of manufacture, a decimal finder comprising a stationary member and a member shiftably supported in relation to said stationary member, one of which members carries a reference symbol and the other of which carries a cipher, and uniformly spaced numerals increasing in value in opposite directions from this cipher, and indexing means for shifting said shiftable member relative to said stationary member in either direction selectively to bring a selected one of said numerals or said cipher into registry with said reference symbol, said finder also comprising indicia in addition to said symbol, said cipher and said numerals for indicating the direction of the movement produced by said means for shifting.

CHARLES L. DICKSON.